(12) United States Patent
Chee

(10) Patent No.: US 9,015,436 B2
(45) Date of Patent: Apr. 21, 2015

(54) PERFORMING AN ATOMIC OPERATION WITHOUT QUIESCING AN INTERCONNECT STRUCTURE

(75) Inventor: Pik Shen Chee, Penang (MY)

(73) Assignee: Intel Corporation, Santa Clara, CA (US)

( * ) Notice: Subject to any disclaimer, the term of this patent is extended or adjusted under 35 U.S.C. 154(b) by 762 days.

(21) Appl. No.: 13/214,384

(22) Filed: Aug. 22, 2011

(65) Prior Publication Data

US 2013/0054915 A1 Feb. 28, 2013

(51) Int. Cl.
*G06F 12/00* (2006.01)
*G06F 9/52* (2006.01)

(52) U.S. Cl.
CPC ................................ *G06F 9/526* (2013.01)

(58) Field of Classification Search
CPC .................................................. G06F 12/1416
USPC .................................................. 711/145, 163
See application file for complete search history.

(56) References Cited

U.S. PATENT DOCUMENTS

| 5,404,482 | A | | 4/1995 | Stamm | |
|---|---|---|---|---|---|
| 5,442,755 | A | * | 8/1995 | Shibata | ........................ 710/108 |
| 6,009,488 | A | | 12/1999 | Kavipurapu | |
| 8,335,903 | B2 | * | 12/2012 | Hwang et al. | ................. 711/163 |
| 8,347,010 | B1 | * | 1/2013 | Radovanovic | ................ 710/240 |
| 2004/0064675 | A1 | | 4/2004 | Jahnke | |

FOREIGN PATENT DOCUMENTS

JP 2009093344 4/2009

OTHER PUBLICATIONS

Intel Corporation, "An Introduction to the Intel QuickPath Interconnect," Jan. 2009, pp. 1-22.
Intel Corporation, "Intel 64 and IA-32 Architectures Software Developer's Manual, vol. 3A: System Programming Guide, Part 1," Table of Contents and pp. 8-1 to 8-26, May 2011.
International Searching Authority, "Notification of Transmittal of the International Search Report and the Written Opinion of the International Searching Authority," mailed Feb. 22, 2013, in International application No. PCT/US2012/050828.

* cited by examiner

*Primary Examiner* — Kalpit Parikh
(74) *Attorney, Agent, or Firm* — Trop, Pruner & Hu, P.C.

(57) ABSTRACT

In one embodiment, the present invention includes a method for receiving a lock message for an address in a processor from a quiesce master of a system. This lock message indicates that a requester agent of the system is to enter a locking phase with respect to the address. Responsive to receipt of this message, logic of the processor can write an entry in a tracking buffer of the processor for the address and thereafter allow a transaction to be sent from the processor via an interconnect if an address of the transaction does not match any address stored in the tracking buffer. Other embodiments are described and claimed.

17 Claims, 5 Drawing Sheets

PERFORMING AN ATOMIC OPERATION WITHOUT QUIESCING AN INTERCONNECT STRUCTURE

BACKGROUND

Computer systems are formed of many different components that are coupled together to provide processing capabilities, communication capabilities, storage capabilities and so forth. In modern computer systems oftentimes there are multiple processors such as two or more multicore processors.

In the course of operations within a multiprocessor computer system, multiple processors can seek to access the same data. Accordingly, a coherency scheme can be provided for the system to enable a consistent view of data in the system. One such mechanism used in many computer systems is a lock protocol in which a processor seeks to block operation of the other processors to thus prevent those processors from issuing cycles on various interconnects while the locking processor performs an atomic operation on a given data. However, this lock operation can have a large impact on system performance, as all of the other processors in the system are prevented from issuing transactions until the atomic operation has completed.

DETAILED DESCRIPTION

In various embodiments, system agents can perform transactions on an interconnect such as a point-to-point (PtP) interconnect, bus or other interconnection mechanism even when another agent has a certain memory region locked. That is, so long as it can be determined that a transaction to be sent from an agent does not conflict with a region associated with a pending lock, the transaction can be sent during the lock. Although embodiments described herein are in connection with multiprocessor systems including multiple processors, chipsets such as input/output hubs (IOHs), peripheral controller hubs or so forth, understand the scope of the present invention is not limited in this regard and is applicable to other systems that provide for shared access to certain data.

Figure 1:
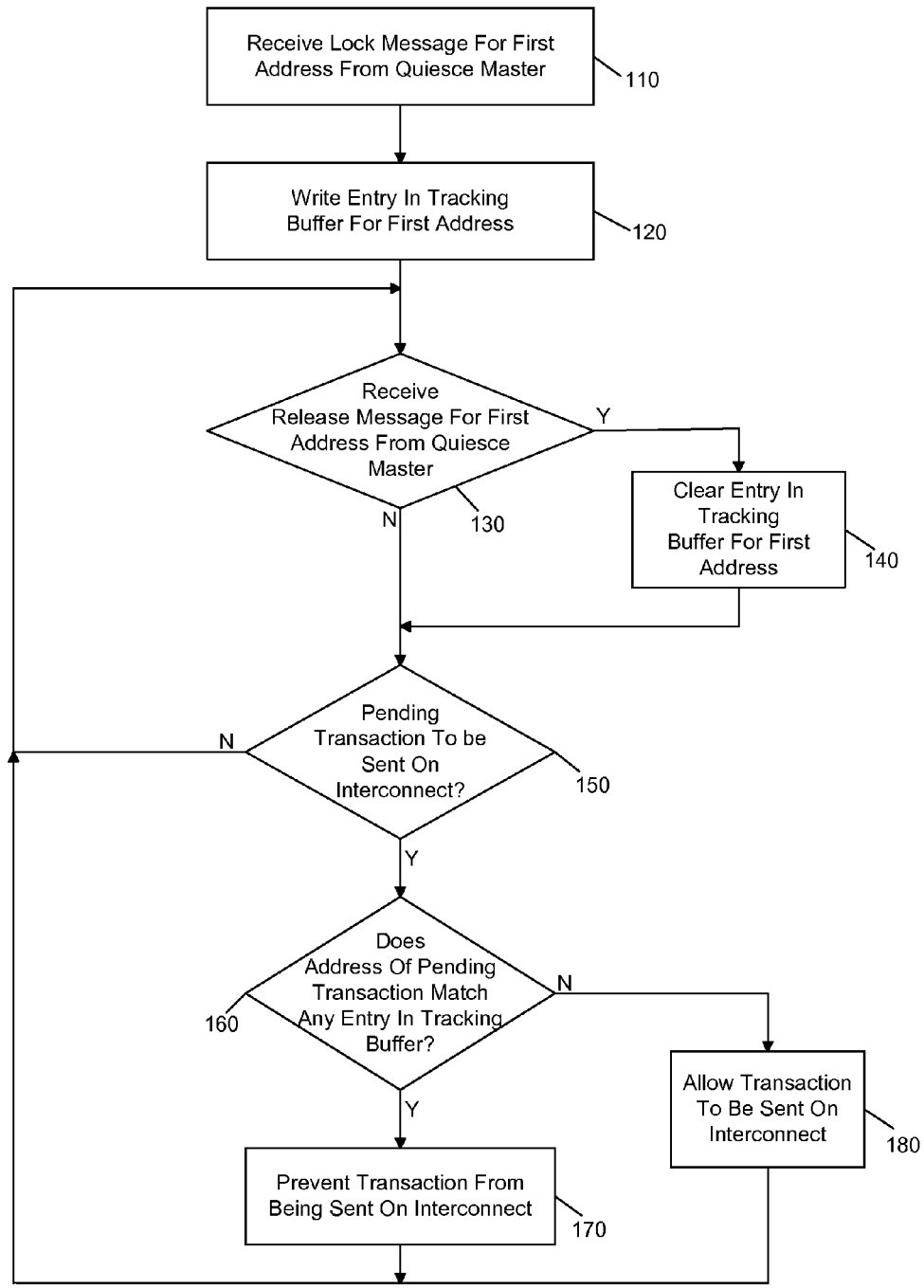
FIG. 1 is a flow diagram of a method in accordance with an embodiment of the present invention.

Referring now to FIG. 1, shown is a flow diagram of a method in accordance with an embodiment of the present invention. As shown in FIG. 1, method 100 may be performed by a system agent such as a processor that seeks to issue transactions on an interconnect such as PtP interconnect or bus. Although the scope of the present invention is not limited in this regard, in various embodiments method 100 can be performed by logic within an uncore portion of a multicore processor. However understand that the method of FIG. 1 can be performed by other logic in different embodiments. As seen, method 100 may begin by receiving a lock message for a first address from a quiesce master (block 110). This quiesce master in one embodiment may be an I/O hub. As will be discussed further below, this lock message may be a stop request message and further may include or be followed by the first address. This address thus identifies a memory region. In some embodiments, a single address can be provided that corresponds to, e.g., a cacheline with data to be subjected to a lock. However, in other embodiments this address may correspond to a given cacheline and a next cacheline (CL and CL+1). In still further embodiments, this address may be of a memory region, e.g., a page-sized region of memory that is subject to a lock. Note that this lock may have been requested by another processor to enable the processor to perform an atomic operation on data present at the address or within a memory region represented by the address.

Still referring to FIG. 1, control passes to block 120 where an entry can be written in a tracking buffer of the processor for the first address. As an example, a cache controller of uncore logic of the multicore processor may include a tracking buffer that includes a plurality of entries, where each entry is for a memory region of the system that is currently subject to a lock. Various information can be stored in these entries. For example in one embodiment each entry may include the address, a valid indicator, an identification of the requester of the lock and so forth.

As seen, control then passes to diamond 130 where it can be determined whether a release message for the first address has been received from the quiesce master. This release message may thus correspond to an indication that the locking processor has deasserted the lock on this address or memory region. If so, control passes to block 140 where the entry in the tracking buffer for this first address can be cleared.

If instead no release message has been received, the lock remains effective for this first address. In various embodiments, in contrast to conventional system operation even though a lock is in effect, the processor can still send transactions along an interconnect, so long as the transactions do not conflict with any addresses that are subject to a current lock. Accordingly, control passes to diamond 150 where it can be determined whether the processor has a pending transaction to be sent along the interconnect. As an example, a transmission buffer can be present in the uncore to store pending transactions to be sent along the interconnect. If any transactions are present in this buffer, control passes to diamond 160. There it can be determined whether an address of the pending transaction selected to be transmitted from the interconnect matches an entry in the tracking buffer. This analysis thus determines whether the address of this transaction would conflict with any currently pending lock operations. If it does not conflict, control passes to block 180 where the transaction is allowed to be sent along the interconnect, as in this case the transaction does not interfere with any locked address.

Otherwise, if the address matches an entry in the tracking buffer, this means that a conflict would occur and accordingly control passes to block 170 where this transaction can be prevented from being sent on the interconnect while the conflicting address remains present in an entry in the tracking buffer. Note that from both of blocks 170 and 180, control passes back to diamond 130 discussed above. Although shown with this particular implementation in the embodiment of FIG. 1, understand the scope of the present invention is not limited in this regard.

Figure 2:
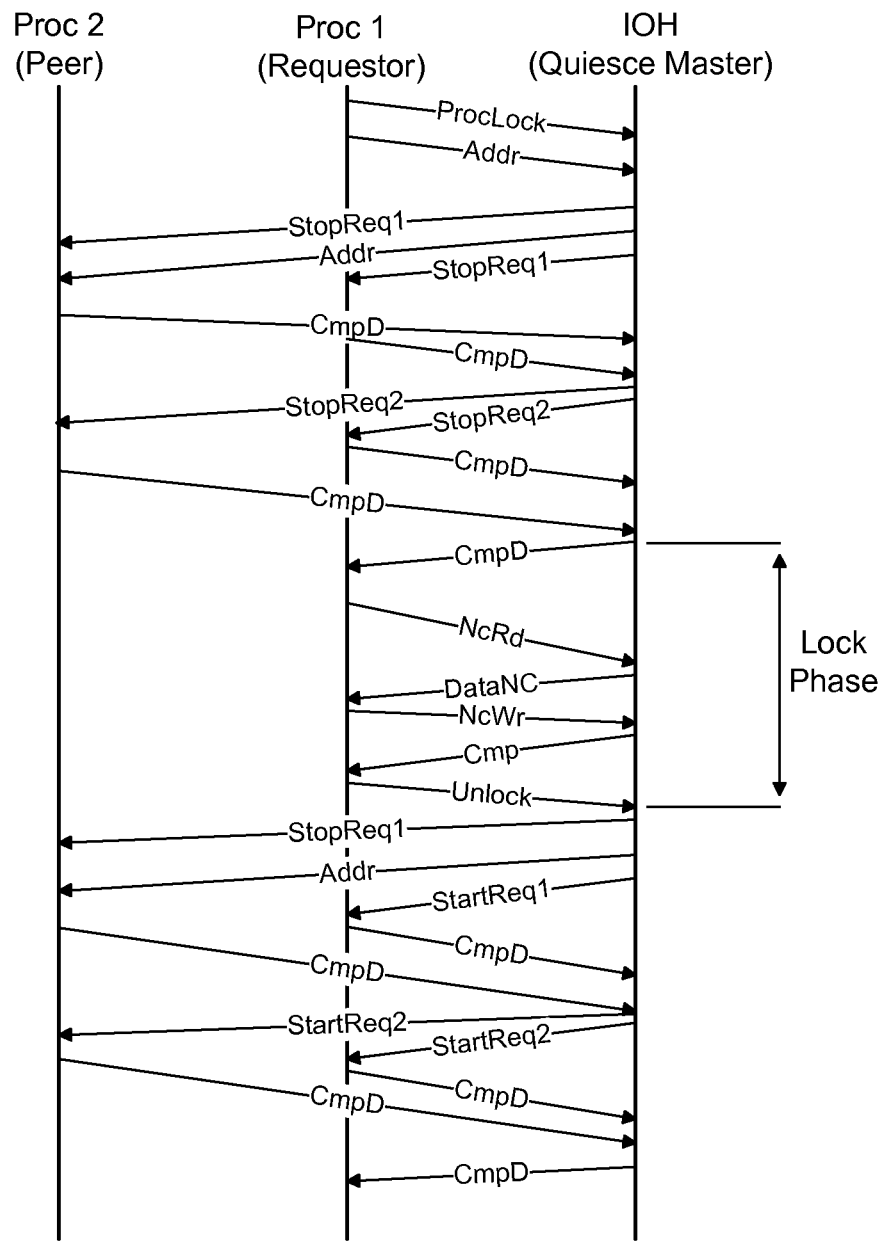
FIG. 2 is a flow diagram of signaling performed in accordance with an embodiment of the present invention.

To further illustrate an operation in accordance with an embodiment of the present invention, reference can be made to FIG. 2, which is a flow diagram of signaling performed in accordance with an embodiment of the present invention. As shown in FIG. 2, three agents are present, namely a requestor processor (PROC1), a peer processor (PROC2) and a quiesce master which in the embodiment of FIG. 2 may be an I/O hub. Although shown with only three such agents, understand the scope of the present invention is not limited in this aspect, and in many embodiments, more than two processing nodes and more than a single quiesce master may be present. Furthermore, while the peer and requestor agents are shown as being processors, understand the scope of the present invention is not limited in this regard and in other embodiments other devices such as controllers, graphics chips and so forth can also be agents.

As seen in FIG. 2, operations may begin when the requestor initiates a processing lock request (ProcLock) which is directed to the quiesce master. Sent along with this lock request is an address for the lock request. That is, rather than simply requesting an overall lock which thus causes all other agents to quiesce their operations along their interconnects, the request is for a lock only to a given memory region that is represented by the address.

As seen, responsive to receipt of this request in the quiesce master, the master sends a lock message to the agents of the system. Specifically as seen in FIG. 2, this lock message (StopReq1) can be sent (along with the address for which the lock is made) to the peer agent and furthermore, this lock message can also be sent to the requestor. Responsive to receipt of this lock message, the peer agent can write an entry in its lock tracking buffer to indicate this address as being subject to a lock. When this has been done, the peer agent can send an acknowledgement back to the quiesce master (namely a completion message (CmpD)). As further seen, the requester can also send an acknowledgement of this message.

Then, the quiesce master may send another lock message to the agents, which can be used for purposes of deadlock avoidance. Note that this lock message (StopReq2) is not followed by an associated address. Upon acknowledgement of receipt of this lock message by the agents, a lock phase can now be entered. That is, the requestor can perform its desired atomic operation, as it is ensured that no other agents are accessing or are in the process of accessing the address. To begin the lock phase, the quiesce master sends an acknowledgment to the requestor. Upon receipt of this acknowledgement, the requestor can perform its atomic operation, which in the embodiment shown may be an atomic read-modify-write in which data at the address is read, the data is modified by the requestor, and the modified data is then written back to its source. This is shown in FIG. 2 as a non-coherent read (NcRead) followed by a data return (DataNc). Thereafter, the requestor can perform its modifications of the data and accordingly write the data back (as a non-coherent write (NcWr)).

Note that during the lock phase, the peer agent can send one or more transactions, so long as the addresses associated with these transactions do not correspond to addresses that are present in entries of its lock tracking buffer. So long as this is the case, the peer agent can send one or more transactions during this lock phase.

When the modified write data has been received by the quiesce master, it may send a completion back to the requestor, which causes the requestor to send an unlock request message to thus end the lock phase. Accordingly as shown in FIG. 2, the quiesce master can send a release message to the agents of the system. Specifically as shown in FIG. 2 this release message (StartReq1) can be sent along with or followed by the address. Responsive to receipt of this release message, the peer can clear its lock tracking buffer entry associated with this address and send a completion message. Acknowledgment of this operation can be followed by another release message to the system agents. Although shown with particular implementation in the embodiment to FIG. 2, understand the scope of the present invention is not limited in this regard.

Figure 3:
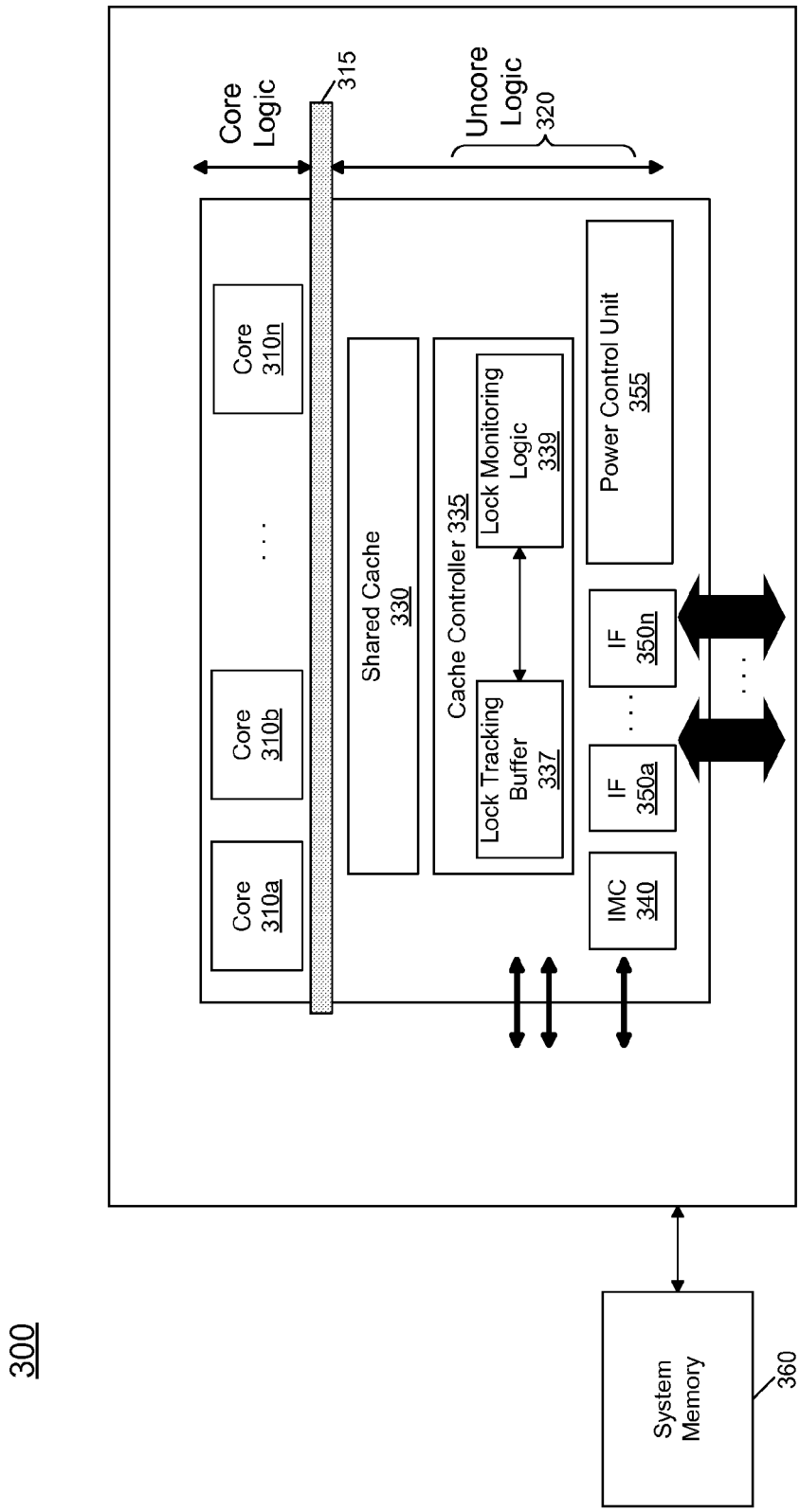
FIG. 3 is a block diagram of a processor in accordance with an embodiment of the present invention.

Referring now to FIG. 3, shown is a block diagram of a processor in accordance with an embodiment of the present invention. As shown in FIG. 3, processor 300 may be a multicore processor including a plurality of cores $310_a$-$310_n$. In one embodiment, each core may be configured to operate at multiple voltages and/or frequencies, and to enter turbo mode as instructed. The various cores may be coupled via an interconnect 315 to a system agent or uncore 320 that includes various components. As seen, the uncore 320 may include a shared cache 330 which may be a last level cache. In addition, the uncore may include an integrated memory controller 340, various interfaces 350 and a power control unit 355.

Still with reference to FIG. 3, the uncore further includes a cache controller 335, which can control coherency operations and management of shared cache 330. In addition, cache controller 335 may include a lock tracking buffer 337, which can be used to store entries to identify locations in system memory that are the subject of pending locks. Specifically, as discussed above, lock tracking buffer 337 can include a plurality of entries, each of which stores an address associated with a received lock message, which can be sent to the processor when a quiesce master grants a lock to a given agent for an address that represents a memory location.

Cache controller 335 can further include lock monitoring logic 339 which can monitor incoming messages to the processor to determine whether any lock messages have been received and if so to cause an address associated with the message to be stored in lock tracking buffer 337. In addition, lock monitoring logic 339 may cause an entry to be cleared when a given lock has been released. Still further, lock monitoring logic 339 may further aid in processing of outgoing transactions from the processor such that the logic can determine whether an address of a given transaction is the subject of a pending lock operation by reference to the entries within lock tracking buffer 337, and to prevent transmission of a transaction if a conflict would occur.

With further reference to FIG. 3, processor 300 may communicate with a system memory 360, e.g., via a memory bus. In addition, by interfaces 350, connection can be made to various off-chip components such as peripheral devices, mass storage and so forth. While shown with this particular implementation in the embodiment of FIG. 3, the scope of the present invention is not limited in this regard. Also note that the processor and memory of FIG. 3 may be a single multicore processor and corresponding local memory of a multiprocessor system having multiple processors and memories.

Embodiments can be incorporated in many different system types that can be designed with various system agents such as processor sockets, chipsets, memory, among other system agents coupled via point-to-point interconnects or other serial-based interconnects.

Figure 4:
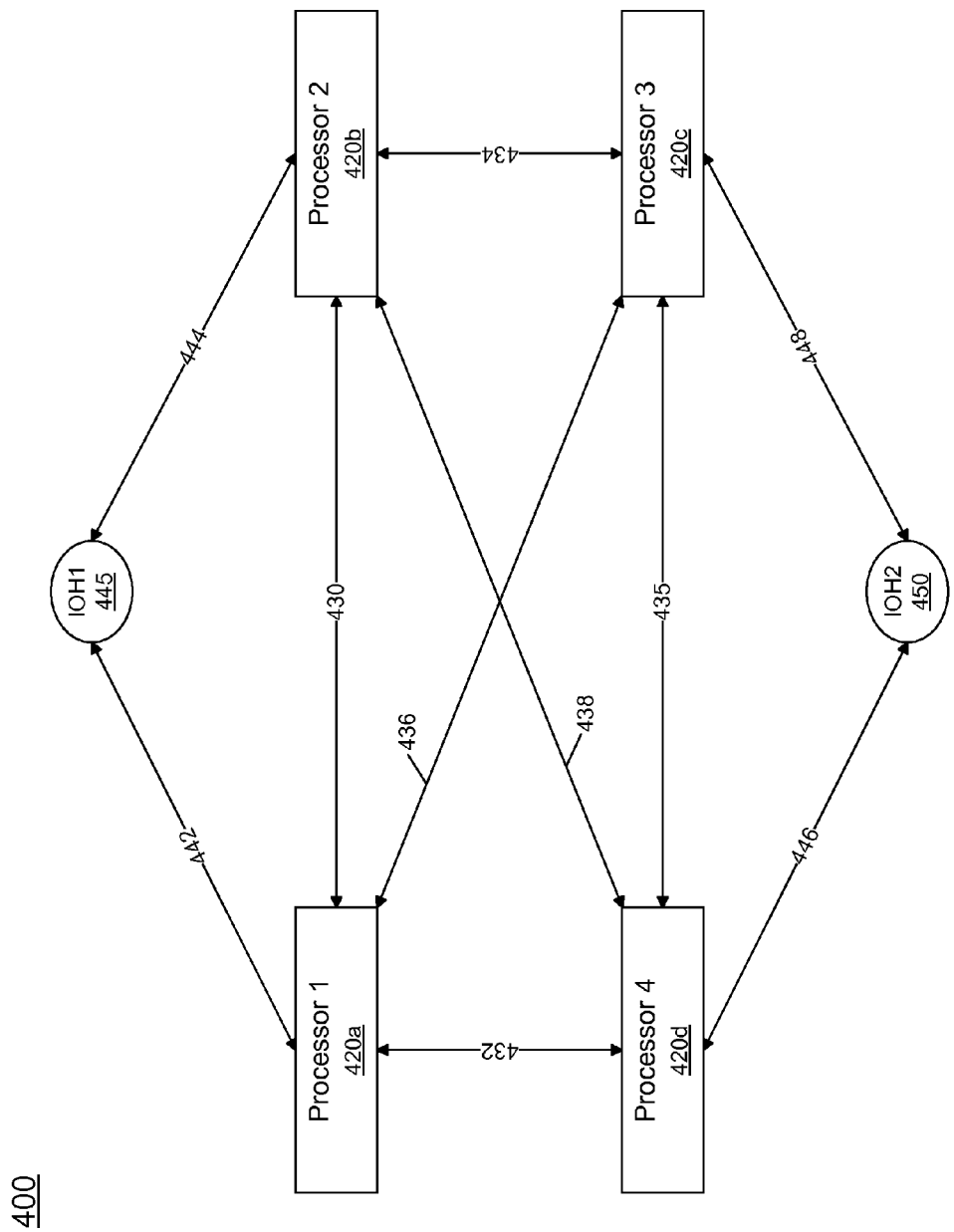
FIG. 4 is a block diagram of a system in accordance with one embodiment of the present invention.

FIG. 4 is a block diagram of a system that may be coupled together via PtP interconnects. As shown in FIG. 4, system 400 may include multiple processor sockets, namely processor sockets 420a-420d (generically processor socket 420). Each processor socket may be a multicore processor that includes a tracking buffer and logic in accordance with an embodiment of the present invention to monitor addresses subject to locks and control transaction transmission accordingly during lock phases.

Still referring to FIG. 4, system 400 further includes chipset components. Specifically, as shown in FIG. 4, system 400 includes a first hub agent 445 and a second hub agent 450, both of which may correspond to IOHs. Such hub agents may be used to couple system 400 to various peripheral devices, networks, or other such systems.

To enable communication between the various components of system 400, various point-to-point interconnects may be present to couple the components together. Specifically, as shown in FIG. 4, each processor socket 420 may include an interface to three links to the other processor sockets. Furthermore, interconnects to one of first or second hub agents 445 and 450 may further be provided per processor socket. Accordingly, first processor socket 420a may provide an interface to links 430, 432, and 436 between itself and second, third, and fourth processor sockets 420b-d. First processor socket 420a further provides an interface to a link 442 coupled between itself and first hub agent 445. Similarly, second processor socket 420b is coupled to third and fourth processor sockets 420c and 420d via interconnects 434 and 438, respectively and is further coupled to first hub agent 445 via interconnect 444. Similarly, third and fourth processor sockets 420c and 420d are coupled via an interconnect 435, while both of these processor sockets communicate with second hub agent 450 via interconnects 446 and 448, respectively. While described with this particular implementation in the embodiment of FIG. 4, it is to be understood that the scope of the present invention is not so limited.

Figure 5:
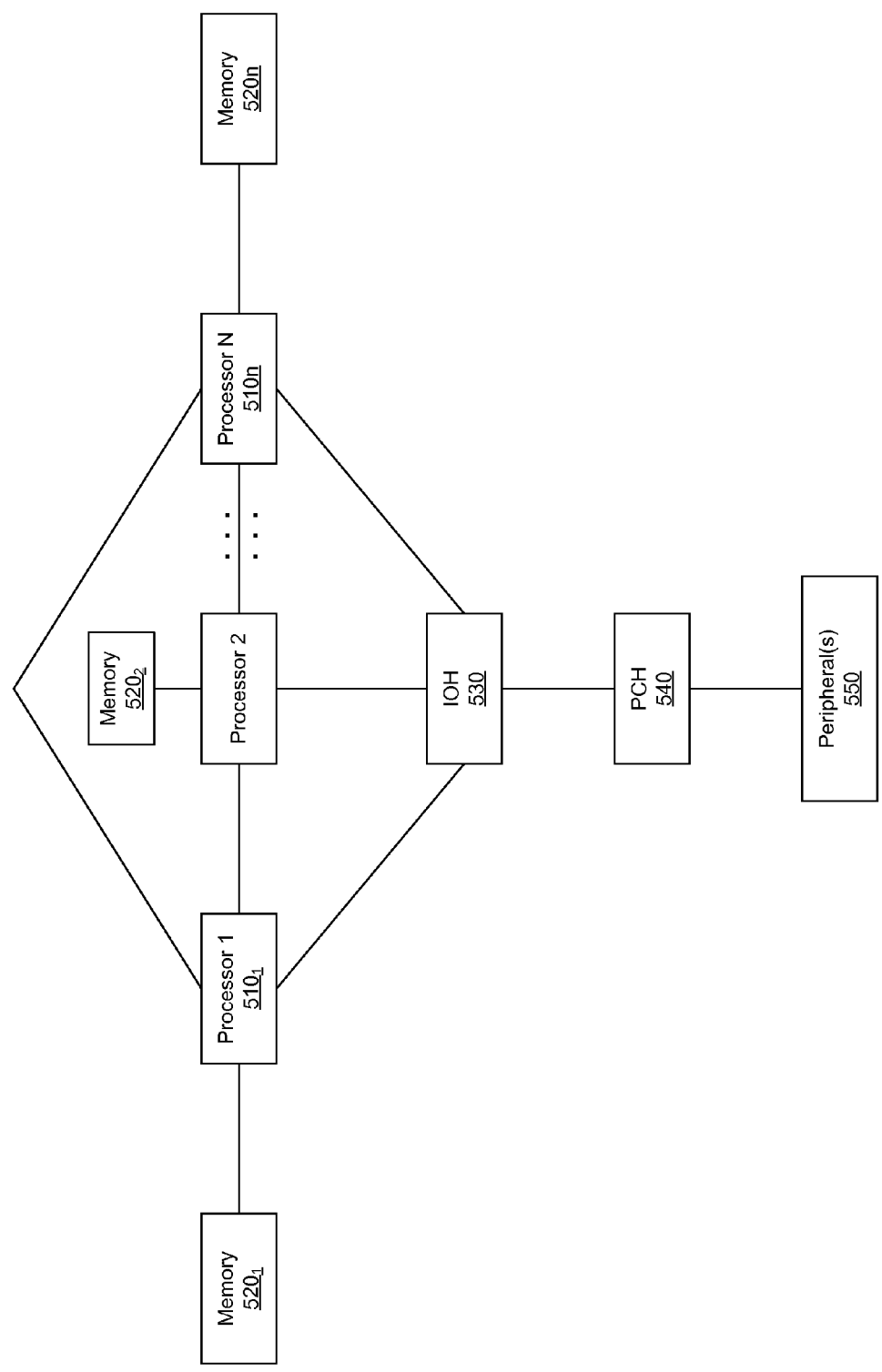
FIG. 5 is a block diagram of a system in accordance with another embodiment of the present invention.

Embodiments can be implemented in other systems as well. Referring now to FIG. 5, shown is a block diagram of a system in accordance with another embodiment of the present invention. As shown in FIG. 5, multiprocessor system 500 may include a plurality of processors $510_1$-$510_n$, each of which can be a multicore processor that includes a tracking buffer and logic in accordance with an embodiment of the present invention to monitor addresses subject to locks. As seen, each of the processors can be connected to each other processor by a PtP interconnect. In addition, each processor 510 may be coupled to a local portion of a system memory, namely local memories $520_1$-$520_n$.

In turn, each processor 510 may couple to an IOH 530 which in various embodiments can act as a quiesce master to thus receive incoming lock requests from the different processors.

When such requests are received with an indication of a region that is to be subject to the lock, IOH 530 can send corresponding lock messages to the processors associated with the address to thus cause these locations to be maintained in a tracking buffer of the processors and to be monitored. In this way, the other processors can send unrelated transactions (that is, unrelated to the address of the lock transactions) during a locking phase to thus reduce system latency. As further seen, IOH 530 can couple to other components of the system. In the embodiment shown, IOH 530 may couple to a peripheral controller hub 540 that in turn can couple to one or more peripheral devices 550. Although shown at this high level in the embodiment of FIG. 5, understand the scope of the present invention is not limited in this regard.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving a lock message for a first address in a first processor from a quiesce master coupled to the first processor, the lock message to indicate that a requester agent is to enter a locking phase with respect to the first address;
writing an entry in a tracking buffer of the first processor for the first address, the entry to store the first address and an identifier for the requester agent;
sending an acknowledgement from the first processor to the quiesce master after writing the entry in the tracking buffer for the first address;
receiving a second lock message without an address in the first processor from the quiesce master;
sending a second acknowledgement from the first processor to the quiesce master responsive to the second lock message to enable the locking phase to begin; and
allowing a transaction to be sent from the first processor via an interconnect if an address of the transaction does not match any address stored in the tracking buffer.

2. The method of claim 1, further comprising receiving a release message for the first address from the quiesce master.

3. The method of claim 2, further comprising clearing the entry in the tracking buffer storing the first address responsive to receiving the release message for the first address.

4. The method of claim 1, further comprising preventing the transaction from being sent from the first processor if the address of the transaction matches an entry in the tracking buffer.

5. The method of claim 2, wherein the lock message comprises a stop request message and the first address.

6. The method of claim 5, wherein the release message comprises a start request message and the first address.

7. The method of claim 1, wherein the requester agent performs an atomic operation on data at the first address during the locking phase.

8. The method of claim 7, further comprising sending a transaction associated with a second address from the first processor during the locking phase.

9. An apparatus comprising:
a multicore processor including a plurality of cores, a cache memory and a cache controller, the cache controller including a lock tracking buffer having a plurality of entries each to store an address associated with a memory region that is subject to a lock operation and an identifier of a requester of the lock operation, and a first logic to enable a transaction for an address that is not present in any of the plurality of entries of the lock tracking buffer to be sent from the multicore processor during a lock phase of at least one of the lock operations, wherein the first logic is to write a first entry in the lock tracking buffer with a first address responsive to receipt of a lock message having the first address, the lock message to be received from a quiesce master to indicate that an agent is to perform an atomic operation on data at the first address, send an acknowledgement from the multicore processor to the quiesce master after the first entry is written in the lock tracking buffer, receive a second lock message without an address in the multicore processor from the quiesce master, send a second acknowledgement from the multicore processor to the quiesce master responsive to the second lock message to enable the lock phase to begin, and allow the transaction to be sent from the multicore processor via an interconnect.

10. The apparatus of claim 9, wherein the agent is to perform the atomic operation during the lock phase of the lock operation.

11. The apparatus of claim 10, wherein the first logic is to clear the first entry in the lock tracking buffer after completion of the atomic operation.

12. The apparatus of claim 9, wherein the first logic is to enable a plurality of transactions to be sent from the multicore processor during the lock phase, wherein each of the plurality of transactions is for an address not present in any of the plurality of entries of the lock tracking buffer.

13. A system comprising:
a first hardware processor to execute instructions and to issue a request for a lock on data associated with a first address;
a second hardware processor coupled to the first hardware processor to execute instructions and including a tracking buffer having a plurality of entries each to store an address associated with a lock and an identifier of a requester of the lock; and
a quiesce master coupled to the first and second hardware processors and to receive the lock request and to issue a lock message including the first address to cause the second hardware processor to store the first address in a first entry of the tracking buffer, receive a first acknowledgement from the second hardware processor and the first hardware processor, issue a second lock message to the first and second hardware processors without an address, receive a second acknowledgement from the second hardware processor and to thereafter enable a lock phase in which the first hardware processor is to perform an atomic operation on the data associated with the first address, wherein the second hardware processor is to send a transaction associated with a second address not present in the tracking buffer during the lock phase.

14. The system of claim 13, wherein the second hardware processor further comprises a logic to store the first address in the first entry of the tracking buffer responsive to receipt of the lock message.

15. The system of claim 14, wherein the logic of the second hardware processor is to clear the first entry in the tracking buffer after the lock is concluded.

16. The system of claim 14, wherein the first hardware processor is to issue a request to release the lock after performance of the atomic operation.

17. The system of claim 16, wherein the logic of the second hardware processor is to receive a release message for the first address from the quiesce master and clear the first entry of the tracking buffer responsive to the release message.

* * * * *